(12) United States Patent
Nakatsuka et al.

(10) Patent No.: US 9,266,208 B2
(45) Date of Patent: Feb. 23, 2016

(54) METAL RING MANUFACTURE METHOD AND METAL RING MANUFACTURE DEVICE

(75) Inventors: Kazushige Nakatsuka, Tochigi (JP); Akihiro Nemoto, Tochigi (JP); Akinori Higuchi, Tochigi (JP); Katsuyuki Nakajima, Tochigi (JP); Seiichi Sasaki, Tochigi (JP); Nobuyuki Kouda, Tochigi (JP); Kanomi Hayashi, Tochigi (JP); Satoru Saito, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 695 days.

(21) Appl. No.: 13/575,736

(22) PCT Filed: Nov. 24, 2011

(86) PCT No.: PCT/JP2011/077085
§ 371 (c)(1),
(2), (4) Date: Jul. 27, 2012

(87) PCT Pub. No.: WO2012/111213
PCT Pub. Date: Aug. 23, 2012

(65) Prior Publication Data
US 2013/0168372 A1    Jul. 4, 2013

(30) Foreign Application Priority Data

Feb. 14, 2011  (JP) ................................. 2011-028578

(51) Int. Cl.
| | |
|---|---|
| *B23K 26/361* | (2014.01) |
| *B23Q 7/04* | (2006.01) |
| *B23K 26/08* | (2014.01) |
| *B23K 26/38* | (2014.01) |
| *B23P 15/00* | (2006.01) |
| *F16G 5/16* | (2006.01) |

(52) U.S. Cl.
CPC .............. *B23Q 7/04* (2013.01); *B23K 26/0823* (2013.01); *B23K 26/0838* (2013.01); *B23K 26/361* (2015.10); *B23K 26/38* (2013.01); *B23P 15/00* (2013.01); *F16G 5/16* (2013.01); *Y10T 29/49789* (2015.01); *Y10T 29/5124* (2015.01)

(58) Field of Classification Search
CPC combination set(s) only.
See application file for complete search history.

(56) References Cited

U.S. PATENT DOCUMENTS

| | | | | | |
|---|---|---|---|---|---|
| 3,797,338 | A | * | 3/1974 | Molnar | .............................. 82/46 |
| 4,205,566 | A | * | 6/1980 | Molnar | ........................... 82/101 |
| 5,383,380 | A | * | 1/1995 | Sartori | ........................... 82/70.1 |
| 5,531,433 | A | * | 7/1996 | Hawkes et al. | ............ 271/10.01 |

(Continued)

FOREIGN PATENT DOCUMENTS

| | | |
|---|---|---|
| JP | 2000-071083 | 3/2000 |
| JP | 2005-319574 | 11/2005 |

(Continued)

*Primary Examiner* — Dana Ross
*Assistant Examiner* — Renee L Miller
(74) *Attorney, Agent, or Firm* — Rankin, Hill & Clark LLP (57) ABSTRACT

Provided is a metal ring manufacture method and a metal ring metal device capable of manufacturing a plurality of metal rings at good efficiency without damaging the metal rings. The metal rings (R) are detached from a drum retaining unit (16) by a metal ring holding unit (28) with the arrangement state thereof being maintained; thereafter, each metal ring (R) clamped in the arrangement state by a pair of fingers (45, 46) of a metal ring clamping unit (29) is delivered sequentially in the arrangement direction by a ring delivering unit disposed in the second finger (46).

5 Claims, 5 Drawing Sheets

(56) References Cited

U.S. PATENT DOCUMENTS

| | | | |
|---|---|---|---|
| 5,847,358 A * | 12/1998 | Franke et al. | 219/121.67 |
| 6,223,574 B1 * | 5/2001 | Teratoko et al. | 72/48 |
| 6,502,741 B2 * | 1/2003 | Kasuya | 229/5.5 |
| 7,013,691 B2 * | 3/2006 | Shimoda | 72/110 |
| 7,204,005 B2 * | 4/2007 | Fukada et al. | 29/407.05 |
| 7,513,180 B2 * | 4/2009 | Minowa et al. | 82/101 |
| 2003/0176154 A1 * | 9/2003 | Narusaki et al. | 451/398 |
| 2004/0020257 A1 * | 2/2004 | Sato et al. | 72/111 |
| 2004/0035170 A1 * | 2/2004 | Sato et al. | 72/111 |
| 2004/0065128 A1 * | 4/2004 | Narusaki et al. | 72/111 |
| 2005/0023392 A1 * | 2/2005 | Hsu et al. | 242/171 |
| 2006/0169115 A1 * | 8/2006 | Minowa et al. | 83/176 |

FOREIGN PATENT DOCUMENTS

| | | |
|---|---|---|
| JP | 2006-124757 | 5/2006 |
| JP | 2008-520437 | 6/2008 |
| JP | 2010-184246 | 8/2010 |
| WO | 2006-054885 | 5/2006 |

* cited by examiner

METAL RING MANUFACTURE METHOD AND METAL RING MANUFACTURE DEVICE

TECHNICAL FIELD

The present invention relates to a metal ring manufacture method and a metal ring manufacture device for manufacturing a plurality of endless belt-like metal rings by trimming a drum having a cylindrical shape formed from a metal thin plate into round slices.

BACKGROUND ART

For example, in a belt adopted in a continuously variable transmission for power transmission, in order to bindle integrally a plurality of elements arranged circularly in laminations, a laminated ring obtained by laminating a plurality of metal rings is used.

The metal rings constituting the laminated ring are manufactured in the following way. First, both edges of a rectangular metal thin plate is welded together to form a cylindrical drum, the drum is mounted to a cylindrical drum retaining unit having a variable outer diameter. At the moment, the outer diameter of the drum retaining unit is enlarged to retain firmly the drum. Thereafter, by trimming the drum into round slices with a predetermined width, a plurality of metal rings are formed while being retained by the drum retaining unit. The retaining state is released by reducing the outer diameter of the drum retaining unit, each metal ring is detached from the drum retaining unit and transported to a post-processing step such as a grinding process or the like.

In transporting the plurality of metal rings to a post-processing step, it is necessary to extrude the metal rings one by one into a transporting passage configured to transport the metal rings to the post-processing step. If such operation of extruding the metal rings is performed by a worker manually, for example, it will be extremely troublesome and the working efficiency would be worse.

Therefore, there has been disclosed in conventional arts a technique in which the metal rings are extruded one by one by using an extruding device provided with a rotating shaft having spiral extruding grooves formed in the outer circumferential surface thereof in accordance with the width of the metal rings in the axial direction (refer to patent document 1).

In the mentioned device, the metal rings whose retaining state is released as the outer diameter of the drum retaining unit is reduced is mounted to the extruding shaft of the extruding device with the arrangement state thereof being maintained in the same axial direction, and thereafter, the extruding shaft is rotated.

According thereto, each metal ring is delivered along the spiral extruding groove, it is possible to extrude the metal rings one by one with certainty without manual operations, thereby, it is possible to improve the working efficiency.

CITATION LIST

Patent Documents

Patent document 1: Japanese Patent Laid-open No. 2005-319574

SUMMARY OF INVENTION

Technical Problem

However, in the conventional method mentioned above, if the position of a metal ring is deviated from the extruding groove in the extruding shaft, it is impossible to restrict the behavior of the metal ring; the metal ring overlaps with an adjacent metal ring, therefore, not only the metal ring can not be extruded smoothly but also the metal ring may be damaged.

The present invention has been accomplished in view of the aforementioned problems, and it is therefore an object of the present invention to provide a metal ring manufacture method and a metal ring metal device capable of manufacturing a plurality of metal rings at good efficiency without damaging the metal rings.

Solution to Problem

To attain an object described above, the present invention provides a metal ring manufacture method for manufacturing a plurality of endless belt-like metal rings by trimming a drum having a cylindrical shape from a metal thin plate into round slices. The metal ring manufacture method of the present invention comprises: a drum introducing step of introducing the drum into a drum retaining unit having a variable outer diameter to be mounted and retained by the drum retaining unit; a drum trimming step of forming a plurality of metal rings by trimming the drum into round slices with a predetermined width while the drum is being retained by the drum retaining unit in such a way that the outer diameter thereof is enlarged so as to press the inner circumferential surface of the drum; and a ring extruding step of detaching the plurality of metal rings from the drum retaining unit after the press against the inner circumferential surface of the drum is released as the outer diameter of the drum retaining unit is reduced for extruding the plurality of metal rings. The ring extruding step includes a metal ring holding step of using a metal ring holding unit capable of being opened or closed freely to hold the plurality of metal rings from the outer circumferential surface thereof with the arrangement state of the plurality of metal rings retained by the drum retaining unit being maintained; a metal ring detaching step of detaching the plurality of metal rings from the drum retaining unit by moving the drum retaining unit holding the plurality of metal ring along the axial direction of the drum retaining unit after the outer diameter thereof is reduced; a metal ring clamping step of taking the metal rings from the metal ring holding unit by using a metal ring clamping unit provided with a pair of fingers extending in parallel to each other to clamp both a portion on the inner circumferential surface and a portion on the outer circumferential surface in the circumferential direction of the plurality of metal rings with the arrangement state thereof detached from the drum retaining unit being maintained; and a metal ring delivering step of sequentially delivering in the arrangement direction each metal ring clamped by the two fingers by moving the plurality of metal rings away from the tips of the two fingers one by one so as to extrude the plurality of metal rings by using a ring delivering unit disposed at least on one finger of the metal ring clamping unit.

According to the method of the present invention, after the metal ring holding step, the metal rings are detached from the drum retaining unit in the ring detaching step with the arrangement state of the metal ring being maintained in the same axial direction; thereafter, in the metal ring clamping step, each metal ring clamped in the arrangement state by the pair of fingers disposed in the metal ring clamping unit is delivered sequentially in the arrangement direction in the ring delivering step. At the moment, each metal ring is restricted by the clamping of the two fingers to prevent undesired movement and is delivered in the extruding direction; since the metal rings are extruded one by one by moving away from the tip of both fingers in the arrangement order, it is possible to extrude the metal rings at good efficiency without any damages.

In the metal ring manufacture method of the present invention, the drum introducing step includes a drum supplying step of supplying the drum from a drum supplying passage, a drum holding step of holing the supplied drum from the outer circumferential surface thereof by using a drum holding unit capable of being opened or closed freely, and a drum mounting step of mounting the drum to the drum holding unit by moving the drum holding unit holding the drum in the axial direction of the drum retaining unit after the outer diameter thereof is reduced.

The drum is formed into the cylindrical shape from the metal thin plate, thereby, it is easy to have deformations occurred. For example, if the shape of either of both end openings is deformed to an elliptical shape, when mounting the drum to the drum retaining unit, the edges of the openings of the drum interfere with the outer circumferential surface of the drum retaining unit, preventing the mounting to be performed smoothly, and in some cases, the edges of the openings of the drum may be damaged.

Therefore, in the present invention, the drum mounting step is performed to mount the drum to the drum retaining unit as the drum is being held by the drum holding unit from the outer circumferential surface thereof in the drum holding step. Accordingly, the deformation occurred in the drum is corrected via the holding by the drum holding unit. Thus, the drum can be mounted to the drum retaining unit with the shape of both openings thereof being kept at a roughly round circle. Thereby, it is possible to perform the mounting of the drum to the drum retaining unit smoothly and it is also possible to prevent the drum from being damaged.

In the metal ring manufacture method of the present invention, it is preferable that the drum trimming step includes a drum rotating step of rotating the drum about the axial line thereof according to the rotations of the drum retaining unit, and a laser beam radiating step of radiating a trimming laser beam onto the drum being rotated by the drum rotating step to trim the drum into round slices, the laser beam is radiated onto the drum in the trimming proceeding direction of the drum at a predetermined oblique angle in the laser beam radiating step.

To trim the drum into round slices, there may be ways such as pressing a disc-like grindstone or trimming blade against the drum as the drum is rotating around the axial line according to the rotations of the drum retaining unit, or radiating a trimming laser beam onto the rotating drum.

In the case of trimming the drum by using a trimming laser beam, when the material of the drum, namely the metal is radiated by the laser beam, it produces the dross resulted from welding or sublimation; thereby, the edges of each metal ring after the trimming are adhered with such dross.

If the dross adheres to the edges of each metal ring, the dross makes the edges uneven; therefore, when each metal ring is clamped by the two fingers of the metal ring clamping unit, the posture of each metal ring becomes unstable, vibrations occur in each metal ring when it is moved in the ring delivering step, which may cause the metal ring to be damaged due to the contact of the parts in metal rings which are not clamped by the two fingers.

In the present invention, when the trimming laser beam is being radiated by the laser beam radiating step to the drum being rotated by the drum rotating step, the laser beam is radiated onto the drum at a predetermined oblique angle in the proceeding direction of trimming the drum. According thereto, the dross resulted from the radiation of the laser beam is discharged before the portion being radiated by the laser beam, which makes it possible to prevent the dross from adhering to the trimming edges. Thereby, when each metal ring is clamped by the two fingers of the metal ring clamping unit, it is possible to stabilize the posture of each metal ring, and it is possible to extrude the metal ring without being damaged.

The present invention provides a metal ring manufacture device for manufacturing a plurality of endless belt-like metal rings by trimming a drum having a cylindrical shape from a metal thin plate into round slices. The metal ring manufacture device of the present invention comprises: a drum introducing unit configured to introduce the drum into a drum retaining unit having a variable outer diameter to be mounted and retained by the drum retaining unit; a drum trimming unit configured to form a plurality of metal rings by trimming the drum into round slices with a predetermined width while the drum is being retained by the drum retaining unit in such a way that the outer diameter thereof is enlarged so as to press the inner circumferential surface of the drum; and a ring extruding unit configured to detach from the drum retaining unit the plurality of metal rings after the press against the inner circumferential surface of the drum is released as the outer diameter of the drum retaining unit is reduced for extruding the plurality of metal rings. The ring extruding unit includes a metal ring clamping unit provided with a pair of fingers extending in parallel to each other to clamp both a portion on the inner circumferential surface and a portion on the outer circumferential surface in the circumferential direction of the plurality of metal rings with the arrangement state thereof detached from the drum retaining unit being maintained, and the metal ring clamping unit including a metal ring delivering unit disposed at least on one finger to sequentially deliver each metal ring clamped by the two fingers in the arrangement direction by moving the plurality of metal rings away from the tips of the two fingers one by one to extrude the plurality of metal rings.

According to the metal ring manufacture device of the present invention, the metal ring clamping unit disposed in the ring delivering unit clamps each metal ring with a pair of fingers, and delivers the metal rings one by one by the ring delivering unit. At the moment, the metal ring clamping unit clamps the plurality of metal rings from both a portion on the inner circumferential surface and a portion on the outer circumferential surface in the circumferential direction, the contact area between each metal ring and the two fingers is relatively small, thereby, it is possible to inhibit the damage occurred in each metal ring. Thereafter, each metal ring clamped by the two fingers in the arrangement state is sequentially moved away from the tips of the two fingers by the ring delivering unit, the metal rings can be extruded one by one with certainty.

In the present invention, the drum introducing unit is provided with a drum holding unit which is capable of being opened or closed freely and is configured to hold a drum supplied to a predetermined supplying position from the outer circumferential surface thereof, and a drum transporting unit configured to transport the drum from the supplying position to a mounting position toward the drum retaining unit via the drum holding unit; the ring extruding unit is provided with a metal ring holding unit which is capable of being opened or closed freely and is configured to hold the plurality of metal rings from the outer circumferential surface thereof with the arrangement state of the plurality of metal rings retained by the drum retaining unit being maintained, and a metal ring transporting unit configured to detach the plurality of metal rings from the drum retaining unit by transporting the plurality of metal rings from the drum retaining unit after the outer diameter thereof is reduced via the metal ring holding unit in the axial direction; the metal ring clamping unit is configured to take the plurality of metal rings detached from the drum retaining unit via the metal ring holding unit and extrude the plurality of metal ring from the metal ring holding unit.

The drum introducing unit mounts the drum being held by the drum holding unit from the outer circumferential surface thereof to the drum retaining unit via the drum transporting unit. According thereto, it is possible to maintain the drum at the state of being a roughly round circle as it is introduced; and meanwhile, only by reducing the outer diameter of the drum retaining unit without relative slides between the inner circumferential surface of the drum and the drum retaining unit, it is possible to retain the drum on the drum retaining unit without causing any damages such as abrasions or the like on the drum.

The ring extruding unit holds the plurality of metal rings from the outer circumferential surface thereof via the metal ring holding unit, maintains the holding state of the plurality of metal rings, and discharges the metal rings from the drum retaining unit after the outer diameter thereof is reduced via the metal ring transporting unit. According thereto, it is possible to discharge the plurality of metal rings from the drum retaining unit without relative slides between the inner circumferential surface of the drum and the drum retaining unit and thereby without causing any damages such as abrasions or the like on the drum.

Then, the ring extruding unit takes from the metal ring holding unit each metal ring by clamping it with a pair of finger via the metal ring clamping unit, and discharges the metal rings one by one via the ring delivering unit. As mentioned above, the metal ring clamping unit clamps both a portion on the inner circumferential surface and a portion on the outer circumferential surface in the circumferential direction with the two fingers; therefore, it is possible to inhibit the occurrence of damages on each metal ring.

As mentioned above, according to the present invention, it is possible to manufacture the metal rings without having any damages such as abrasions or the like for certain.

In the metal ring manufacture device of the present invention, a movable platform which is movable in the axial direction of the drum retaining unit and an orthogonal direction to the axial direction is disposed as the drum transporting unit and the metal ring transporting unit and the drum holding unit and the metal ring holding are disposed integrally on the movable platform; accordingly, it is possible to move the drum holding unit and the metal ring holding unit by a common movable platform, which makes the configuration of the device simple so as to reduce the cost thereof.

The metal ring clamping unit may be configured compactly to include the pair of fingers for clamping each metal ring and the ring delivering unit disposed in one finger, therefore, it is possible to dispose it at an arm of a multi joint robot, which makes it possible to improve the degree of freedom in adjusting the distance or the layout between the drum holding unit and the delivering position of each metal ring.

DESCRIPTION OF EMBODIMENTS

Hereinafter, an embodiment of the present invention will be described in detail with reference to the drawings. A metal ring manufacture device 1 illustrated in FIG. 1 according to the present embodiment is used to trim a metal drum D into round slices with a predetermined width so as to manufacture a metal ring R adopted as a ring member of a belt used in a continuously variable transmission (not shown). The drum D is formed into a cylindrical shape by welding together two ends of a rectangular metal thin plate. As the metal thin plate, for example, a maraging steel having a thickness of about 0.3 to 0.4 mm may be used.

Figure 1:
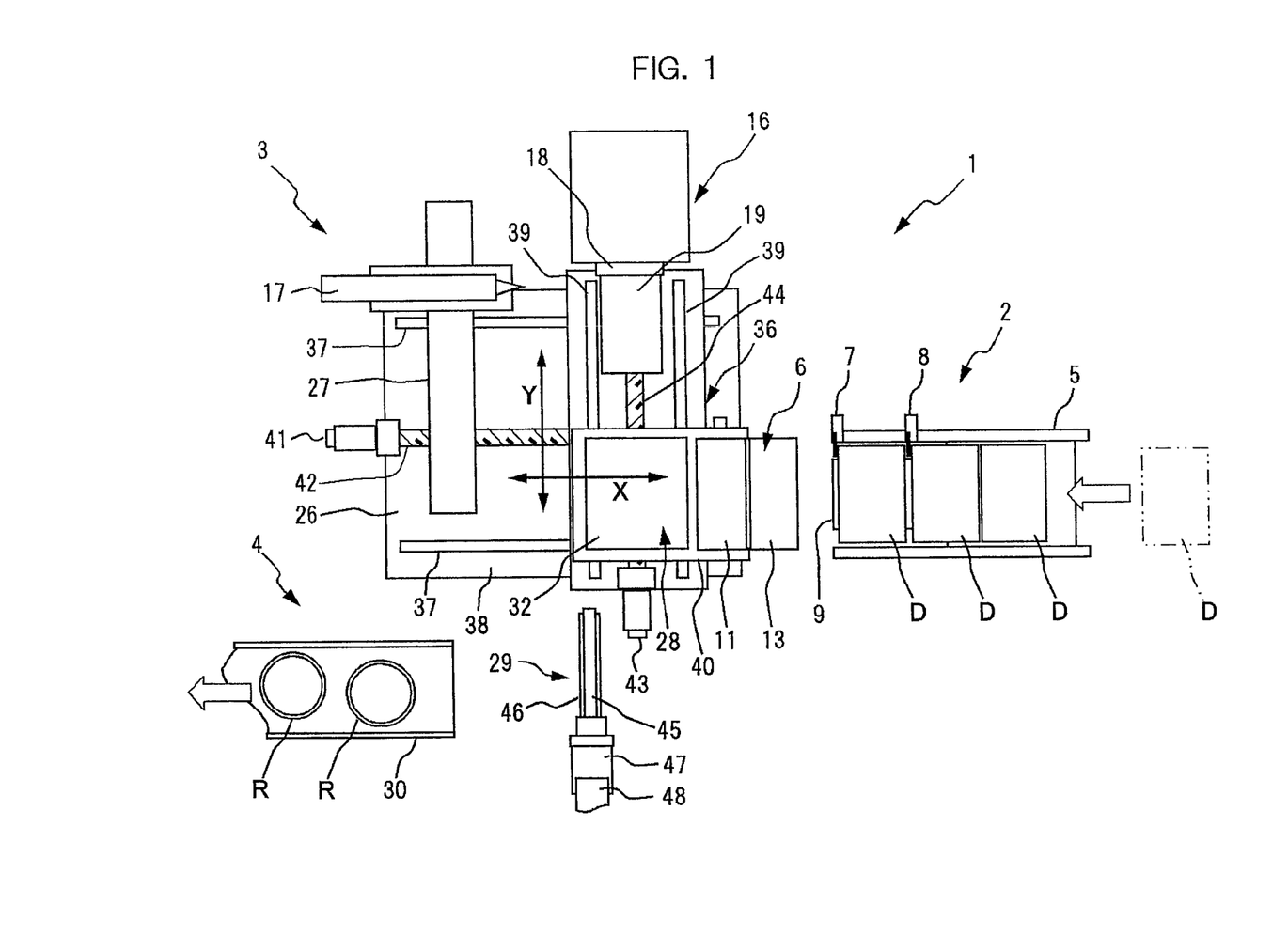
FIG. 1 is a plane view schematically illustrating a metal ring manufacture device according to an embodiment of the present invention.

As illustrated in FIG. 1, the metal ring manufacture device 1 is composed of a drum introducing unit 2 configured to introduce the drum D, a drum trimming unit 3 configured to trim the drum D introduced by the drum introducing unit 2 to form the metal ring R, and a ring extruding (conveying) unit 4 configured to extrude (convey) the metal ring R formed by the drum trimming unit 3.

The drum introducing unit 2 is comprised of a drum supplying passage 5 configured to guide a plurality of drums D in the supplying direction, and a drum holding unit 6 configured to hold the drums D supplied from the end of the drum supplying passage 5.

Figure 2:
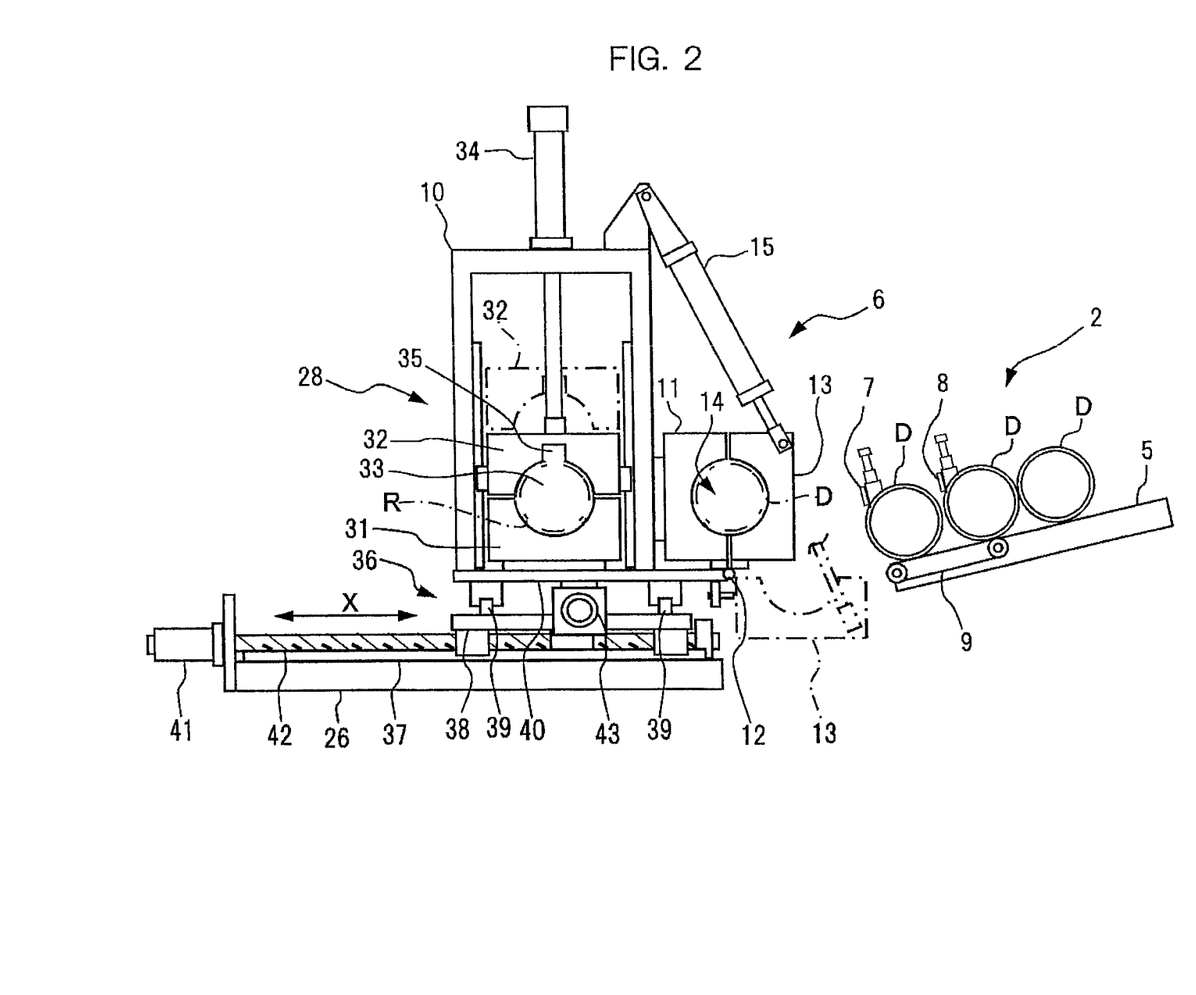
FIG. 2 is a side view schematically illustrating the configuration of a drum holding unit and a metal ring holding unit.

As illustrated in FIG. 2, the drum supplying passage 5 is comprised of a first stopper 7 and a second stopper 8 configured to stop a succeeding drum D when a proceeding drum D is being supplied, and a supplying conveyor 9 configured to deliver the drum D at an end portion of the drum supplying passage 5.

As illustrated in FIG. 2, the drum holding unit 6 is comprised of a stationary member 11 fixed on a frame 10 and a movable member 13 rockably connected to the stationary member 11 via a hinge 12. The stationary member 11 and the movable member 13 form inside a drum retaining member 14 having a circular shape corresponding to the outer circumferential shape of the drum D.

The movable member 13 is driven to move by an oscillating cylinder 15, and as the movable member 13 is oscillated to move away from the stationary member 11, the drum retaining member 14 is opened.

As the movable member 13 is moved to the horizontal posture, the lateral half section of the drum retaining member 14 is opened upward at a position for taking the drum D (supplying position) from the end of the drum supplying passage 5. At this state, while the succeeding drum D is being stopped by the second stopper 8 in the drum supplying passage 5, the proceeding drum D which has been stopped by the first stopper 7 is released to supply the drum D to the supplying conveyor 9. After the supplied drum D is supported on the lateral half section of drum retaining member 14 with the movable member 13 being opened upward, the movable member 13 is oscillated in the uprising direction by the oscillating cylinder 15 until the stationary member 11 and the movable member 13 contact each other to close the drum retaining member 14. Accordingly, the drum D is held by the drum retaining member 14 of the drum holding unit 6 from the outer circumferential surface. The drum D held by the drum holding unit 6 is pressed by the drum retaining member from the outer circumferential surface, therefore, even a deformation or the like occurs on the drum D, it may be corrected into the roughly circular cylindrical shape by the inner shape of the drum retaining member 14.

As illustrated in FIG. 1, the drum trimming unit 3 is provided with a drum retaining unit 16 which rotatably retains the drum D and a laser radiating unit 17 which radiates a trimming laser beam onto the drum D retained by the drum retaining unit 16.

Figure 3:
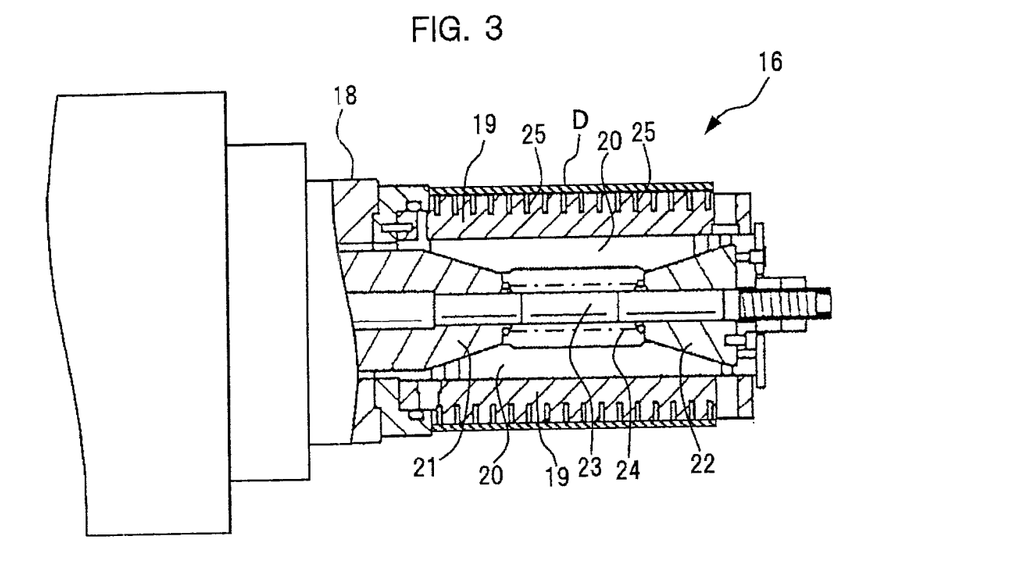
FIG. 3 is a sectional view schematically illustrating a drum retaining unit.

As illustrated in FIG. 3, the drum retaining unit 16 is connected to a rotation shaft 18 driven by a rotation driving device (not shown) such as a motor or the like, and is provided with a cylindrical retaining member 19 which contacts the inner circumferential surface of the drum D for supporting the drum D, a cylindrical pressing member 20 for pressing the inner wall of the retaining member 19, a first taper member 21 and a second taper member 22 having a conic surface for enlarging or reducing the outer diameter of the retaining member 19 via the pressing member 20, a connection bar 23 and a coil spring 24 for adjusting the relative position of the first taper member 21 and the second taper member 22.

The retaining member 19 is disposed with a plurality of first slits (not shown) formed from the basal end to the proximity of the tip end in the axial direction. Similarly, a plurality of second slits are formed from the tip end to the proximity of the basal end. The plurality of first slits and the plurality of second slits are disposed alternatively, and according thereto, the retaining member 19 is flexible and variable in diameter.

The retaining member 19 is disposed with a plurality of circumferential grooves 25 arranged with a predetermined interval (corresponding to the width of the metal ring R) in the axial direction. Each circumferential groove 25 is formed across the whole circumference of the retaining member 19, but not continuous with the crossed portion between the first slit and the second slit.

The pressing member 20 is disposed with basal-end slits (not shown) from the basal end to the proximity of the tip end in the axial direction. Similarly, tip-end slits are formed from the tip end to the proximity of the basal end. The plurality of basal-end slits and the plurality of tip-end slits are disposed alternatively, and according thereto, the pressing member 20 is flexible and variable in diameter.

The diameter enlarging or reducing operation of the pressing member 20 is conducted according to the extension or contraction of the connection bar 23. Specifically, by extending or contracting the connection bar 23 with respect to the first taper member 21 fixed at a position, the second taper member 22 connected to the tip end of the connected bar 23 moves away from or approaches to the first taper member 21; according thereto, the diameter enlarging or reducing operation of the pressing member 20 is conducted. The extension and contraction of the connection bar 23 is conducted by an extension and contraction driving mechanism (not shown). As the diameter of the pressing member 20 is enlarged, the retaining member 19 is pressed from the inner side and thereby the diameter thereof is enlarged.

According to the above-mentioned configurations, the drum retaining unit 16 presses the inner circumferential surface of the drum D after the diameter of the retaining member 19 is enlarged, and rotates the drum D while the drum D is being retained firmly. On the other hand, as the diameter of the retaining member 19 is reduced, the mounting and the detaching of the drum D is conducted.

Although not shown in the drawings, the drum retaining unit 16 is disposed with an air passage for offering an air flow in each circumferential groove 25 of the retaining member 19 so as to cool down the drum D (metal ring) or drive out dust particles.

As illustrated in FIG. 1, the laser radiating unit 17 outputs a trimming laser beam from the tip end onto the drum D retained by the drum retaining unit 16. The laser radiating unit 17 is moved intermittently by a moving mechanism 27 disposed on a base 26 along the axial direction of the drum D retained by the drum retaining unit 16 at a predetermined distance interval (an interval corresponding to each circumferential groove 25 of the retaining member 19). In other words, while the drum D is being rotated by the drum retaining unit 16, the laser radiating unit 17 stops at a position corresponding to each circumferential groove 25 of the retaining member 19; as the drum D is rotated for one round at the stopped position, the laser beam is radiated toward the drum D to trim the drum D. Thereby, the plurality of metal rings R trimmed from the drum D are formed in a state of being retained by the drum retaining unit 16.

Figure 4:
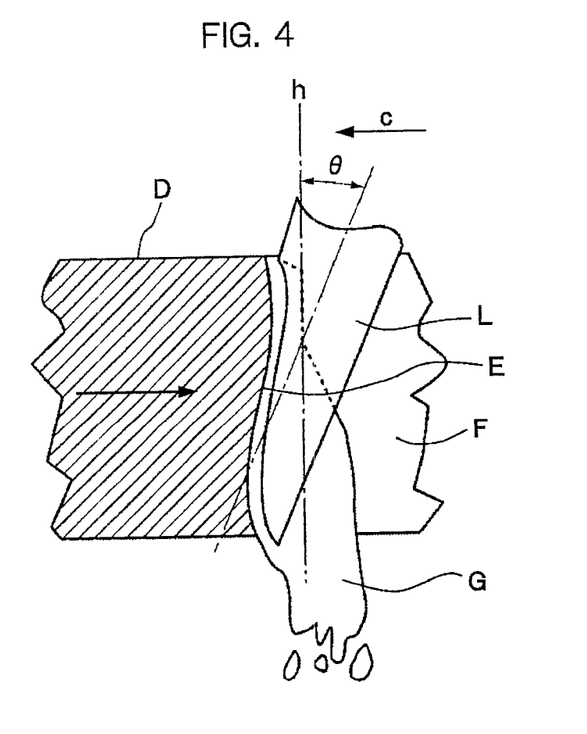
FIG. 4 is a sectional view schematically illustrating a state where a drum is being trimmed.

As illustrated in FIG. 4, in the present embodiment, the laser beam L radiated by the laser radiating unit 17 toward the drum D is configured to incline with a predetermined angle (incident angle $\theta$) to the normal line h relative to the surface of the drum D in the trimming proceeding direction c (opposite to the rotation direction of the drum D) the drum D. Accordingly, in the trimming, the laser beam L is radiated to the drum D with the incident angle $\theta$ in accordance with the distance.

According to transmission torque or the like of the transmission, there are plural types of power transmission belts having a longer perimeter, a shorter perimeter and the like. According to the different perimeters, plural types of the drum retaining units 16 are prepared. Thus, the incident angle $\theta$ of the laser beam is varied according to the perimeter of the power transmission belt. The incident angle $\theta$ may be varied by changing the direction of the tip of the laser radiating unit 17. Or alternatively, as the direction of the tip of the laser radiating unit 17 is fixed to a predetermined angle, the laser radiating unit 17 is translated toward the upstream side of the rotation direction of the drum D rotated by the drum retaining unit 16 in a direction intersected with the radiation direction of the laser beam by the laser radiating unit 17 so as to make the incident angle equal to $\theta$.

Since the laser beam L is radiated on the drum D at the incident angle $\theta$, the trim-proceeding portion E being trimmed by applying the laser beam L on the drum D is nearly vertical to the drum D, therefore, the length of the trim-proceeding portion is relatively short. Accordingly, the melt metal G resulted from the trimming is the minimum, and the retention time of the melt metal G at the trimming edge F of the metal ring R will be the shortest as well.

Thereby, even though the melt metal G becomes the dross and adheres to the trimming edge F of the metal ring R, it is discharged without a longer retention time, as a result thereof, the metal ring R can be prevented from being adhered by the dross.

As illustrated in FIG. 1, the ring extruding unit 4 is provided with a metal ring holding unit 28 configured to hold the plurality of metal rings with the arrangement state being maintained, a metal ring clamping unit 29 configured to clamp the plurality of metal rings with the arrangement state being maintained, and an extruding transportation passage 30 configured to transport the metal ring R to a succeeding step by a conveyor.

As illustrated in FIG. 2, the metal ring holding unit 28 is composed of a stationary member 31 fixed on the frame 10 and a movable member 32 capable of being elevated from the stationary member 31. The stationary member 31 and the movable member 32 form inside a metal ring retaining member 33 having a circular shape corresponding to the outer circumferential shape of each metal ring R in the arrangement state (state of being trimmed from the drum D). The movable member 32 is elevated by an elevating cylinder 34, and as the movable member 32 is elevated to move away from the stationary member 31, the metal ring retaining member 33 is opened.

The movable member 32 of the metal ring holding unit 28 is formed with a groove section 35 for the insertion of a first finger 45 to be described hereinafter.

The metal ring holding unit 28 is disposed on a movable platform 36 via the frame 10. As illustrated in FIG. 1, the movable platform 36 is composed of a first movable plate 38 movable along a first guiding rail 37 disposed on the base 26 and a second movable plate 40 movable along a second guiding rail 39 disposed on the first movable plate 38. The frame 10 is fixed on the second movable plate 40. The second guiding rail 39 is configured to extend in a direction parallel to the axial line of the drum retaining unit 16 (hereinafter, referred to as the Y direction), and the first guiding rail 37 is configured to extend in a direction orthogonal to the axial line of the drum retaining unit 16 (hereinafter, referred to as the X direction). As illustrated in FIG. 1 and FIG. 2, the first movable plate 38 is driven by a motor 41 disposed on the base 26 and a ball screw 42 extending in the X direction, and the second movable plate 40 is driven by a motor 43 disposed on the first movable plate 38 and a ball screw 44 extending in the Y direction.

As illustrated in FIG. 1 and FIG. 2, the metal ring holding unit 28 and the drum holding unit 6 described in the above are disposed on the frame 10 in such a way the metal ring holding unit 28 and the drum holding unit 6 are adjacent to each other and movable integrally. The movable platform 36 functions not only as a drum transporting unit in the present invention for transporting the drum D via the drum holding unit 6 as the drum D is being mounted in the drum retaining unit 16 but also as a metal transporting unit in the present invention for transporting the metal ring R via the metal ring holding unit 28 as the metal ring R is being detached from the drum retaining unit 16. According thereto, it is not necessary to dispose different units to move the metal ring holding unit 28 and the drum holding unit 6 separately, which makes the device simple, cheap and compact.

Figure 5:
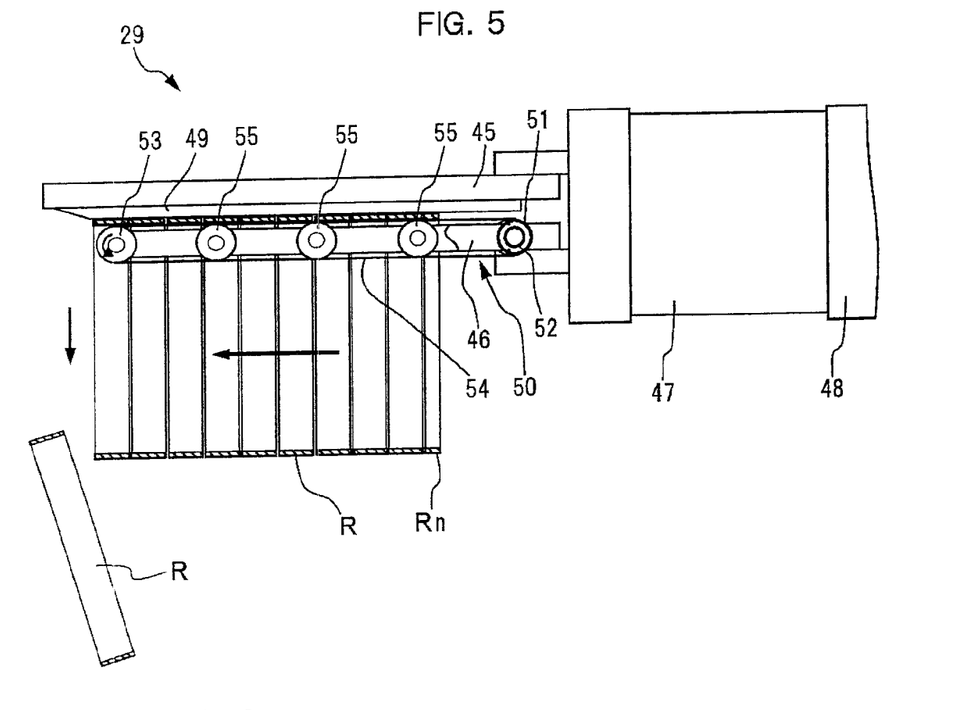
FIG. 5 is a side view schematically illustrating a metal ring clamping unit.

As illustrated in FIG. 1 and FIG. 5, the metal ring clamping unit 29 is composed with a first finger 45 and a second finger 46 and an open-close driving unit 47 configured to open and close the two fingers 45 and 46, and is disposed at the tip end of an arm 48 in a multi joint robot (not drawn). As illustrated in FIG. 5, the first finger 45 and the second finger 46 are extending in parallel to each other, and the length thereof is designed to have a dimension long enough to clamp all of the plurality of metal rings R which are trimmed from the drum D and arranged in the axial direction of the drum D.

Figure 6:
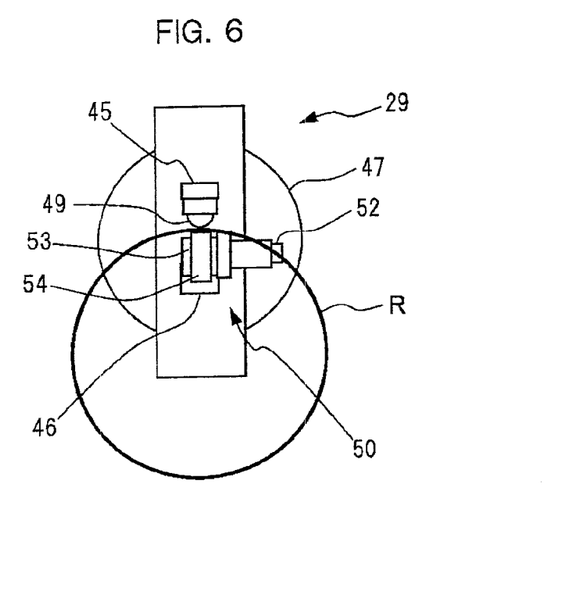
FIG. 6 is a front view schematically illustrating a clamped state of a metal ring by the metal ring clamping unit.

As illustrated in FIG. 5 and FIG. 6, the first finger 45 is disposed with a hard-resin contacting member 49 which is extended into a bar shape at the lower surface of the first finger 45. The contacting member 49 is configured to have a contact with the outer circumferential surface of the metal ring R, and is biased in the contacting direction (downward in the drawings) toward the metal ring R by a pressing spring (not shown) built inside the first finger 45.

The second finger 46 is disposed with a ring delivering unit 50. The ring delivering unit 50 is provided with a driving pulley 51, a motor 52 for rotating the driving pulley 51, a rotatable driven pulley 53, and a rubber belt 54 wrapped over both of the two pulleys 51 and 53. Moreover, between the driving pulley 51 and the driven pulley 53, a plurality of guiding pulleys 55 are disposed to guide the rotation of the belt 54.

Although not illustrated in the drawings, the open-close driving unit 47 is provided with an open-close mechanism such as a chuck cylinder mechanism or the like configured to close or open both fingers by driving the first finger 45 and the second finger 46 to move in a direction that both are contacting closely to each other or the other direction that both are leaving away from each other. As illustrated in FIG. 6, as the first finger 45 and the second finger 46 are closed by the open-close driving unit 47, each metal ring R positioned therebetween in the arrangement state is clamped partially in the circumferential direction.

By clamping each metal ring R with the first finger 45 and the second finger 46, it is possible to retain the metal ring R firmly so as to prevent undesired dropping of the metal ring R or the contacting between adjacent metal rings R. When each metal ring R is being clamped by the first finger 45 and the second finger 46, as the belt 54 of the ring delivering unit 50 is rotated, each metal ring R is delivered along the tip end direction with the state of being clamped stably by the first finger 45 and the second finger 46 being maintained, and is extruded one by one from the tip ends of the two fingers 45 and 46.

Operations of the metal ring manufacture device 1 having the above-mentioned configuration will be described. Firstly, the overall flow will be described with reference to FIG. 1. The drum D supplied from the drum supplying passage 5 is held by the drum holding unit 6 to mount it in the drum retaining unit 16 (drum introducing step). Thereafter, the drum holding unit 6 is receded to expose the drum D being retained by the drum retaining unit 16 so as to trim the drum into round slices with a predetermined width by the laser radiating unit 17 to form the plurality of metal rings (drum trimming step). Subsequently, the metal ring holding unit 28 holds the metal rings R from the drum retaining unit 16 and is moved away from the drum retaining unit 16, the metal ring clamping unit 29 takes the metal rings R from the metal ring holding unit 28, and extrudes the metal rings R from the extruding transportation passage 30 (ring extruding step). At the moment, the metal ring clamping unit 29 may have the tip end thereof pointing downward or have the tip end thereof being maintained horizontally.

Each step mentioned above will be described in detail hereinafter. As illustrated in FIG. 2, in the drum introducing step, firstly, the drum D supplied from the end of the drum supplying passage 5 is supported in the drum retaining member 14 with the movable member 13 of the drum holding unit 6 opened (drum supplying step). Subsequently, the movable member 13 of the drum holding unit 6 is oscillated in the uprising direction to have a contact with the stationary member 11, and the drum D is held from the outer circumferential surface thereof and is housed inside the drum retaining unit 14 (drum retaining step).

Thereafter, with reference to FIG. 1, the first movable plate 38 of the movable platform 36 moves in the X direction to face the drum retaining unit 6 to the drum retaining unit 16, and in addition, the second movable plate 40 of the movable platform 36 moves in the Y direction to advance the drum holding unit 6. According thereto, the drum D being held by the drum holding unit 6 is mounted in the drum retaining unit 16 (drum mounting step). Thereafter, the movable member 13 is oscillated to open the drum retaining member 14, and the drum holding unit 6 is moved back to the supplying position of the drum D by the second movable plate 40 and the first movable plate 38 of the movable platform 36.

Prior to the drum mounting step, the diameter of the retaining member 19 in the drum retaining unit 16 is reduced; after the drum holding unit 6 advances and the retaining member 19 enters inside the drum D, the diameter of the retaining member 19 is enlarged. According thereto, the drum retaining unit 16 is in a state of retaining the drum D from the inner circumferential surface thereof, and the outer circumferential surface of the drum D retained by the drum retaining unit 16 is exposed after the drum holding unit 6 returns back to the supplying position of the drum D.

In the drum trimming step to be conducted subsequently, with reference to FIG. 1, firstly, the drum retaining unit 16 starts to rotate, and accordingly the drum D rotates about the axial line (drum rotating step). The laser radiating unit 17 moves in the axial direction of the drum D and stops at every predetermined distance to radiate the trimming laser beam toward the rotating drum D so as to trim the drum D into the predetermined width (laser beam radiating step).

Thus, by trimming the drum D into round slices, a plurality of metal rings R are formed. As illustrated in FIG. 4, the laser beam L at the moment is being radiated onto the drum D in the trimming processing direction c of the drum D at the predetermined oblique angle θ, the metal rings R can be formed with the adhesion of dross to the trimming edges being inhibited.

In the drum extruding step to be conducted subsequently, with reference to FIG. 2, firstly, the movable member 32 of the metal ring holding unit 28 is elevated by the elevating cylinder 34, thereby the metal ring retaining member 33 is opened. Thereafter, with reference to FIG. 1, the second movable plate 40 of the movable platform 36 is advanced in the Y direction until the opened metal ring retaining member 33 is moved to a position covering the plurality of metal rings R retained by the drum retaining unit 16, and the movable member 32 of the metal ring holding unit 28 is descended by the elevating cylinder 34. According thereto, the plurality of metal rings R retained by the drum retaining unit 16 are housed in the metal ring retaining member 33, held by the metal ring holding unit 28 with the arrangement state thereof being maintained (metal ring holding step).

Thereafter, the diameter of the retaining member 19 in the drum retaining unit 16 is reduced, and the second movable plate 40 of the movable platform 36 is receded in the Y direction, the plurality of metal rings R are detached from the drum retaining unit 16 in the state of being held by the metal ring holding unit 28 (ring detaching step).

Subsequently, the metal ring clamping unit 29 installed at the tip end of the arm 48 of a multi joint robot (not drawn) is used to clamp the metal rings R detached by the metal ring holding unit 28 from the drum retaining unit 16 with the arrangement state thereof being maintained.

Specifically, as the metal rings R are being held by the metal ring holding unit 28, the second finger 46 of the metal ring clamping unit 29 is inserted into the inner side of the metal rings R, and meanwhile the first finger 45 of the metal ring clamping unit 29 is inserted into the groove section 35 formed in the movable member 32 outside the metal rings R. By driving the open-close driving unit 47, the metal rings R are clamped between the first finger 45 and the second finger 46. Thereby, the plurality of metal rings R held by the metal ring holding unit 28 are clamped by the first finger 45 and the second finger 46 with the movements of the metal rings R being restricted.

Figure 7:
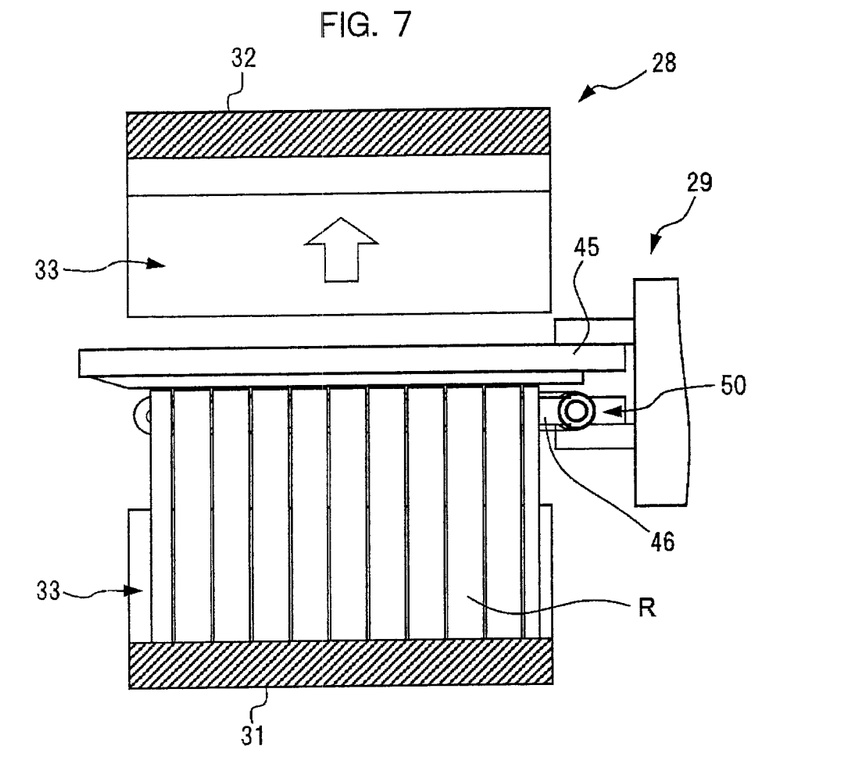
FIG. 7 is an explanatory view schematically illustrating operation of a ring extruding unit.

Thereafter, as illustrated in FIG. 7, the movable member 32 of the metal ring holding unit 28 is elevated to open the metal ring retaining member 33, the metal rings R clamped by the metal ring clamping unit 29 are detached from the metal ring holding unit 28 (metal ring clamping step). According thereto, the metal ring clamping unit 29 can take the plurality of metal rings R from the metal ring holding unit 28 with the arrangement state thereof being maintained. As mentioned afore, when the metal ring R is formed in the drum trimming step, the dross is inhibited from adhering to the trimming edges F, therefore, since the dross is extremely rare, the metal ring R is prevented from becoming uneven. Consequently, the posture of each metal ring R can be stabilized as being clamped by the two fingers 45 and 46 of the metal ring clamping unit 29.

Subsequently, as illustrated in FIG. 1, the metal ring clamping unit 29 is moved upward to the extruding transportation passage 30 by the multi joint robot (not drawn), and each metal ring R clamped by the two fingers 45 and 46 is delivered sequentially in the arrangement direction by the ring delivering unit 50 disposed in the second finger 46 (ring delivering step). Specifically, with reference to FIG. 5, according to the rotations of the driving pulley 51 of the ring delivering unit 50, the outward surface of the belt 54 contacting the inner surface of each metal ring R rotates and moves toward the tip end direction of the second finger 46. According thereto, each metal ring R is moved away from the tip ends of the two fingers 45 and 46 one by one in the arrangement order and extruded to the extruding transportation passage 30.

As the multi-joint robot (not drawn) extrudes the metal ring R toward the extruding transportation passage 30, it is acceptable that the tip ends of the two fingers 45 and 46 are pointed downward so as to move the arm 48. Specifically, by inclining the metal ring clamping unit 29 having the metal rings R in the clamped state so that the tip ends thereof pointing downward, the metal ring R which is the product and a mill end Rn having a narrower width than the metal ring R are extruded smoothly by the ring delivering unit 50 one by one toward the extruding transportation passage 30, and the mill end Rn having a narrower width is extruded to a mill end collection box (not drawn).

As mentioned above, each metal ring R is delivered in the extruding direction while being clamped by the two fingers 45 and 46 and thereby being restricted to move casually away from the delivering direction, since the metal rings R are extruded one by one by moving away from the tip ends of the two fingers 45 and 46 in the arrangement order, it is possible to extrude the metal rings R at good efficiency without any damages.

Figure 8:
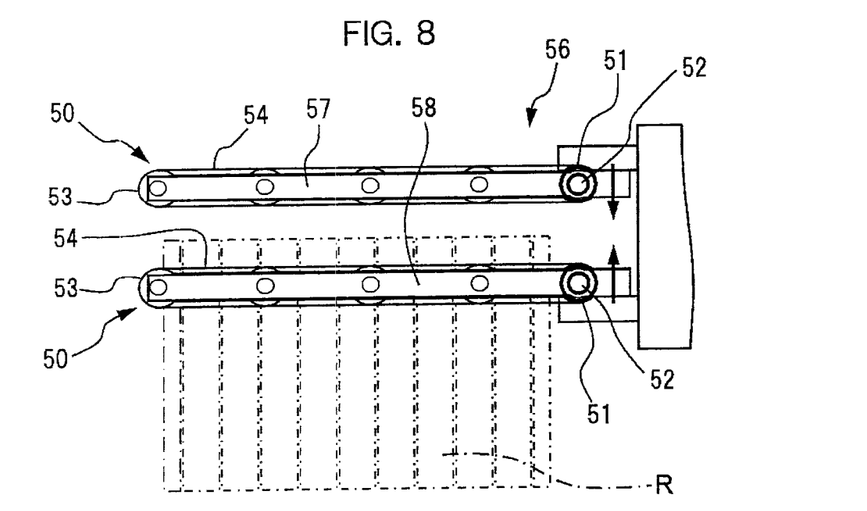
FIG. 8 is an explanatory view schematically illustrating another configuration of the metal ring clamping unit.

In the present embodiment, as illustrated in FIG. 5, only the second finger 46 of the metal ring clamping unit 29 is disposed with the ring delivering unit 50; however, as illustrated by another metal ring clamping unit 56 in FIG. 8, it is acceptable to disposed the ring delivering unit 50 at both a first finger 57 and a second finger 58. Herein, the ring delivering unit 50 has the same configuration as described in the above, thereby, the identical number is given. In this case, although the weight of the metal ring clamping unit 56 will be somewhat greater, the metal ring R can be made dramatically stable and can be delivered certainly in the ring delivering step. Moreover, the inner surface and the outer surface of each metal ring R contact the rubber belt 54 disposed on the first finger 57 and the second finger 58 respectively, each metal ring R can be extruded while preventing the damages or the like to occur on each metal ring R more certainly.

INDUSTRIAL APPLICABILITY

According to the metal ring manufacture method and the metal ring metal device of the present invention, it is possible to manufacture a plurality of endless belt-like metal rings by trimming a drum having a cylindrical shape from a metal thin plate into round slices; thereby, it is possible to manufacture the plurality of metal rings at good efficiency without damaging the metal rings; accordingly, it is usable in manufacturing the metal ring adopted as a ring member of a belt used in a continuously variable transmission.

DESCRIPTION OF REFERENCE NUMERALS

D: drum; R: metal ring; L: laser beam; 1: metal ring manufacture device; 2: drum introducing unit; 3: drum trimming unit; 4: ring extruding unit; 5: drum supplying passage; 6: drum holding unit; 16: drum retaining unit; 28: metal ring holding unit; 29, 56: metal ring clamping unit; 36: movable platform (drum transporting unit, metal ring transporting unit); 45, 57: first finger; 46, 58: second finger; 48: arm of a multi joint robot; 50: ring delivering unit.

The invention claimed is:

1. A metal ring manufacture device for manufacturing a plurality of endless belt-like metal rings by trimming a drum having a cylindrical shape from a metal thin plate into round slices, comprising:
  a drum introducing unit configured to introduce the drum into a drum retaining unit having a variable outer diameter to be mounted and retained by the drum retaining unit;
  a drum trimming unit configured to form a plurality of metal rings by trimming the drum into round slices with a predetermined width while the drum is being retained by the drum retaining unit in such a way that the outer diameter thereof is enlarged so as to press the inner circumferential surface of the drum; and
  a ring conveying unit configured to detach from the drum retaining unit the plurality of metal rings after the press against the inner circumferential surface of the drum is released as the outer diameter of the drum retaining unit is reduced for conveying the plurality of metal rings,
  the ring conveying unit including a metal ring clamping unit provided with a pair of fingers extending in parallel to each other to clamp both a portion on the inner circumferential surface and a portion on the outer circumferential surface in the circumferential direction of the plurality of metal rings with the arrangement state thereof detached from the drum retaining unit being maintained, and
  the metal ring clamping unit including a metal ring delivering unit disposed at least on one finger to sequentially deliver each metal ring clamped by the two fingers in the arrangement direction by moving the plurality of metal rings away from the tips of the two fingers one by one so as to convey the plurality of metal rings.

2. The metal ring manufacture device according to claim 1, wherein
  the drum introducing unit is provided with
  a drum holding unit which is capable of being opened or closed freely and is configured to hold a drum supplied to a predetermined supplying position from the outer circumferential surface thereof, and
  a drum transporting unit configured to transport the drum from the supplying position to a mounting position toward the drum retaining unit via the drum holding unit;
  the ring conveying unit is provided with
  a metal ring holding unit which is capable of being opened or closed freely and is configured to hold the plurality of metal rings from the outer circumferential surface thereof with the arrangement state of the plurality of metal rings retained by the drum retaining unit being maintained, and
  a metal ring transporting unit configured to detach the plurality of metal rings from the drum retaining unit by transporting the plurality of metal rings from the drum retaining unit after the outer diameter thereof is reduced via the metal ring holding unit in the axial direction;
  the metal ring clamping unit is configured to take the plurality of metal rings detached from the drum retaining unit via the metal ring holding unit and convey the plurality of metal ring from the metal ring holding unit.

3. The metal ring manufacture device according to claim 1, wherein
  a movable platform which is movable in the axial direction of the drum retaining unit and an orthogonal direction to the axial direction is disposed as the drum transporting unit and the metal ring transporting unit, and
  the drum holding unit and the metal ring holding are disposed integrally on the movable platform.

4. The metal ring manufacture device according to claim 1, wherein
  the metal ring clamping unit is disposed at an arm of a multi-joint robot.

5. The metal ring manufacture device according to claim 1, wherein
  the drum trimming unit is configured to rotate the drum about an axial line thereof, and to radiate a trimming laser beam onto the drum as the drum is being rotated to trim the drum into round slices,
  wherein the laser beam is radiated onto the drum in a trimming proceeding direction of the drum at a predetermined oblique angle.

* * * * *